CHARLES M. MILLICAN
BILL CHARLES MILLICAN
INVENTOR.

BY Cecil L. Wood

ATTORNEY

Patented Nov. 15, 1949

2,488,312

UNITED STATES PATENT OFFICE 2,488,312

UTILITY HANDLING HOOK

Charles M. Millican and Bill Charles Millican, Grapevine, Tex.

Application September 19, 1946, Serial No. 698,020

5 Claims. (Cl. 294—26)

This invention relates to handling hooks for such articles as bales of hay, cotton, boxes, crates, and similar units, and it has for its principal object the provision of a hook formed with a convenient and readily accessible handle by which the device can be manipulated with the maximum of efficiency and with greater ease than is possible in the use of conventional hooks designed for a similar purpose.

A further object of the invention is that of providing a handling hook in which is embodied features of construction affording a tool which can be utilized with less tiring effect to the user and minimizing the hazard of chafing or callousing the hands.

Broadly, the invention seeks to comprehend the provision of a well balanced and sturdy instrument of light weight and simple design.

While the foregoing objects are paramount, other and lesser objects will become manifest as the description proceeds, taken in connection with the appended drawings wherein.

Figure 3:
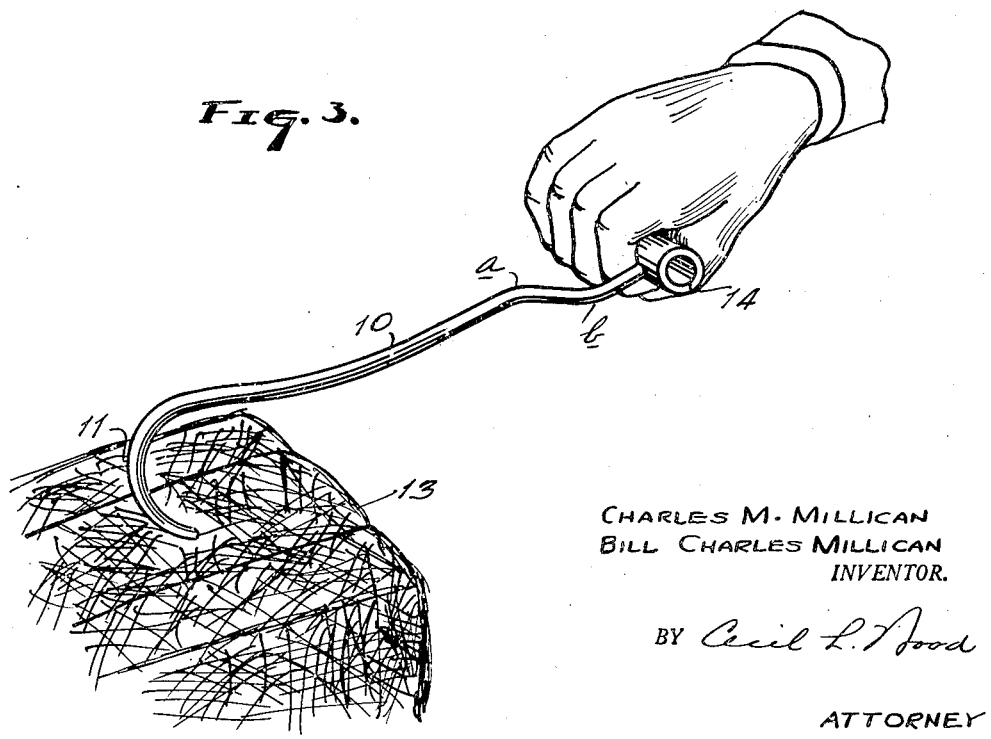
Figure 3 illustrates one of the uses of the invention and the manner of handling the same.

Accordingly, the invention comprises a shank portion 10 having a hook 11 formed on one end which preferably has a sharpened point 12. The hook 11 is shaped to provide an efficient medium for grappling such articles as a bale of hay 13, as illustrated in Figure 3.

Figure 1:
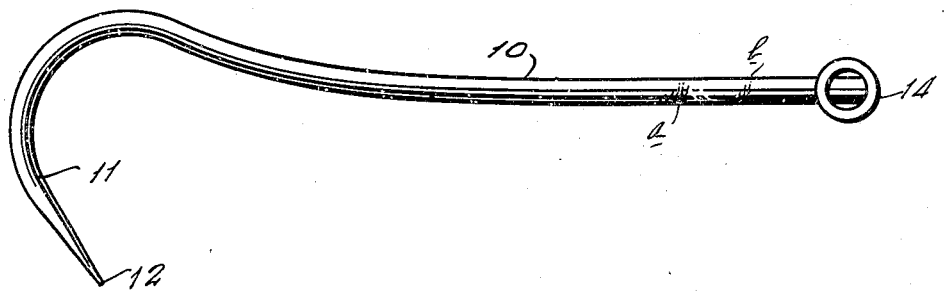
Figure 1 is a side elevational view of the invention, showing the form of the hook and the manner of attaching the handle.
Figure 2:
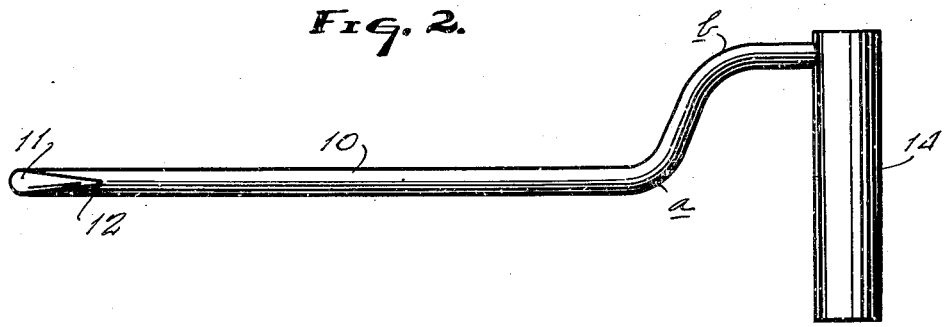
Figure 2 is an inverted plan view of the invention illustrating the offset arrangement of the shank with respect to the handle.

The shank 10 is formed with a bend $a$ laterally from the main body of the shank 10, in the manner shown in Figure 2, and another bend $b$ a brief distance from the bend $a$ whereby this portion of the shank 10 extends oppositely from the hook 11 in parallel alignment with the main body of the shank 10.

A handle 14 is rigidly attached, at one of its ends, to the end of the shank 10 so that the main body thereof is arranged at right angles from the handle 14 and in a plane transverse to the longitudinal axis of the handle 14 intermediate its ends. The result of this arrangement, as illustrated in Figures 2 and 3, is an open access to the handle 14 from one end by which the same is readily grasped for free and easy movement of the hand without the shank of the hook extending between the fingers or eliminating a bifurcation of the shank on each side of the handle 14 by which a "stirrup" type of handle results.

Obviously, in the use of the invention a freer movement of the wrist, and the hand generally, is permitted and with a lesser degree of fatigue and discomfort to the user. The handle 14 may be of conventional tubing, or the like, for economy, and is attached by welding, or the like. It is preferable to drill the handle 14 near one end and insert the end of the shank 10 into the bore, after which operation rigidity is insured by welding the associated parts.

Manifestly, the structure herein shown and described is capable of considerable modification from time to time by persons skilled in the art without departing from the spirit and intent of the invention or the scope of the appended claims.

What is claimed is:

1. In a handling hook, the combination comprising a shank formed with a sharpened hook at one end, a handle rigidly secured opposite said hook, the said shank having a substantially S-shaped bend in a transverse plane to the operative plane of said hook whereby to be rigidly secured to said handle at one end of the latter providing an open balanced grip opposite said hook.

2. In a handling tool, a hook formed with a shank portion having a lateral bend spaced from said hook, the said shank extending rearwardly from said lateral bend in a parallel plane with the main portion of said shank and a handle secured at one of its ends to the end of said shank whereby the said shank and hook are balanced forwardly of said handle.

3. In a handling tool, a hook formed with a shank having a double bend spaced from said hook and extending laterally and rearwardly from the main portion of said shank, and a handle secured at one end to the end of said shank near said bends whereby said main portion of said shank extends forwardly from the center of said handle.

4. In a handling tool, a hook having a shank formed with a lateral bend and a parallel bend opposite said hook, a handle rigidly secured at one end to the end of said shank whereby the main body of said shank extends laterally from said handle intermediate its ends.

5. In a handling tool, a hook formed with a shank portion having a lateral bend spaced from said hook, another bend spaced from said lateral bend directing the end of said shank parallel to the main body thereof, and a handle secured at one of its ends to the end of said shank whereby the main body of said shank extends laterally from said handle in a plane intermediate its ends.

CHARLES M. MILLICAN.
BILL CHARLES MILLICAN.

REFERENCES CITED

The following references are of record in the file of this patent:

UNITED STATES PATENTS

| Number | Name | Date |
|---|---|---|
| 287,727 | Ross | Oct. 30, 1883 |
| 772,097 | Hayes | Oct. 11, 1904 |
| 804,665 | Maretzek | Nov. 14, 1905 |
| 842,420 | Petty | Jan. 29, 1907 |